(12) United States Patent
Kim (10) Patent No.: US 8,424,672 B2
(45) Date of Patent: Apr. 23, 2013

(54) MOVING CART SYSTEM

(75) Inventor: Young Dae Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 654 days.

(21) Appl. No.: 12/539,078

(22) Filed: Aug. 11, 2009

(65) Prior Publication Data

US 2010/0044188 A1 Feb. 25, 2010

(30) Foreign Application Priority Data

Aug. 25, 2008 (KR) ........................ 10-2008-0082893

(51) Int. Cl.
*B65G 47/72* (2006.01)

(52) U.S. Cl.
USPC ................... 198/602; 198/347.3; 198/346.1; 198/465.2

(58) Field of Classification Search ............... 198/345.1, 198/345.2, 345.3, 346.1, 736, 738, 747, 580, 198/347.1, 347.2, 347.3, 457.02, 597, 370.09, 198/465.1, 465.2; 104/162
See application file for complete search history.

(56) References Cited

U.S. PATENT DOCUMENTS

| | | | | |
|---|---|---|---|---|
| 2,681,130 A | * | 6/1954 | Atwood | 198/463.3 |
| 2,970,413 A | * | 2/1961 | Miklosek | 451/412 |
| 3,642,158 A | * | 2/1972 | Koennecke et al. | 414/421 |
| 3,710,917 A | * | 1/1973 | Black et al. | 198/370.09 |
| 3,904,022 A | * | 9/1975 | Lutz | 198/580 |
| 3,989,094 A | * | 11/1976 | Gorenflo et al. | 164/324 |
| 4,259,907 A | * | 4/1981 | Schuck | 104/48 |
| 4,532,869 A | * | 8/1985 | Kondo et al. | 104/166 |
| 4,564,100 A | * | 1/1986 | Moon | 198/341.07 |
| 4,798,275 A | * | 1/1989 | Leemkuil et al. | 198/370.1 |
| 4,860,663 A | * | 8/1989 | Naruse et al. | 104/162 |
| 5,012,917 A | * | 5/1991 | Gilbert et al. | 198/465.2 |
| 5,090,555 A | * | 2/1992 | Kura | 198/465.1 |
| 5,388,684 A | * | 2/1995 | Peck | 198/465.1 |
| 5,735,389 A | * | 4/1998 | Houzouji et al. | 198/809 |
| 6,016,903 A | * | 1/2000 | Lochbrunner | 198/370.1 |
| 6,626,282 B1 | * | 9/2003 | Nishizawa et al. | 198/465.2 |
| 7,090,068 B2 | * | 8/2006 | Matsuo | 198/465.1 |
| 2001/0025765 A1 | * | 10/2001 | Ikegami | 198/347.1 |
| 2010/0316477 A1 | * | 12/2010 | Choi | 414/749.1 |

FOREIGN PATENT DOCUMENTS

| | | |
|---|---|---|
| JP | 2000281209 A | 10/2000 |
| KR | 10-1999-0034797 | 5/1999 |

* cited by examiner

*Primary Examiner* — Gene Crawford
*Assistant Examiner* — William R Harp
(74) *Attorney, Agent, or Firm* — Edwards Wildman Palmer LLP; Peter F. Corless (57) ABSTRACT

The present invention features, in part, a moving cart system that comprises a moving cart main line which is disposed along process portions and on which a moving cart is transpired along a positive length direction of the moving cart main line, a moving cart return line which is disposed parallel with the moving cart main line and on which the moving cart is transpired along a negative length direction of the moving cart return line, traverses which are disposed for connecting a front and a rear of the moving cart main line and the moving cart return line, and a plurality of storages which are disposed perpendicular to the moving cart return line in predetermined intervals along a length direction of the moving cart return line for storing the moving cart, wherein the moving cart moves along the plurality of storages.

12 Claims, 11 Drawing Sheets

MOVING CART SYSTEM

CROSS-REFERENCE TO RELATED APPLICATION

This application claims priority to and the benefit of Korean Patent Application No. 10-2008-0082893 filed in the Korean Intellectual Property Office on Aug. 25, 2008, the entire contents of which are incorporated herein by reference.

BACKGROUND OF THE INVENTION (a) Field of the Invention In general, the present invention relates to a moving cart system. More particularly, the present invention relates to a moving cart system on which a moving cart can be suitably transported and stored.

(b) Description of the Related Art

In a vehicle body manufacturing process, the welding process is particularly important and thus a moving cart system is necessary to realize factory automation for the welding process. Recently, the moving cart system has been developed into a circulation system for combining the production of many kinds of vehicles.

Figure 9:
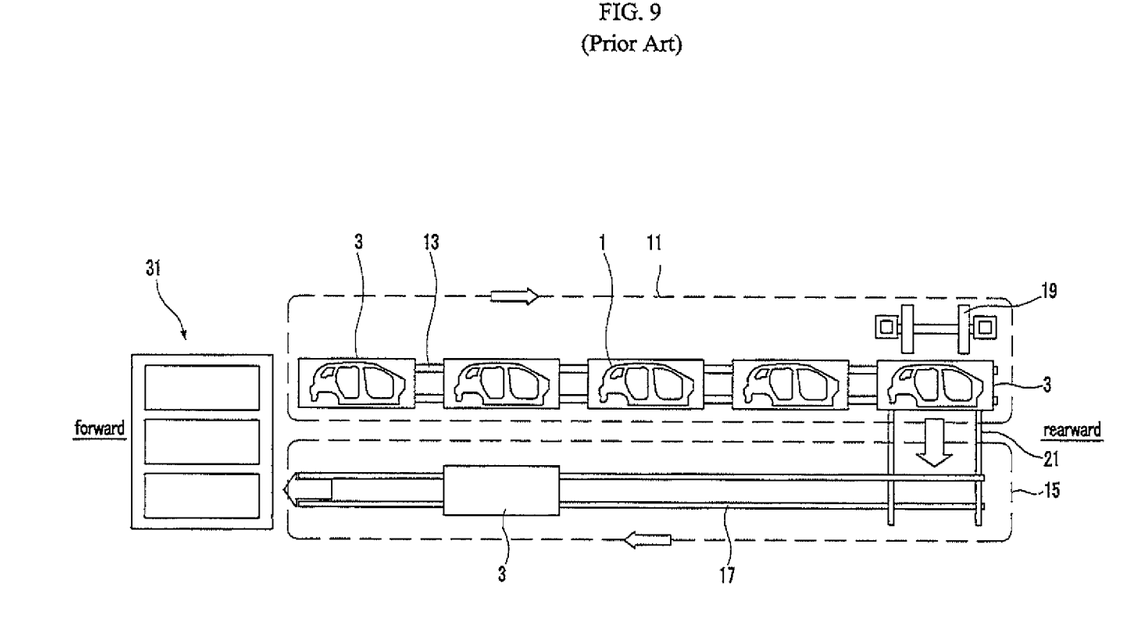
FIG. 9 is a drawing showing layout of an exemplary conventional moving cart system.

For example, a conventional moving cart system, as shown in FIG. 9, is provided along with a process line 11 at the bottom process floor where a number of welding robots (not shown) are in operation. Typically, a moving shuttle 13 is suitably disposed on the process line 11 for a moving cart 3 loaded with a part element 1 to be transported to a robot welding process section. A moving cart return line 17 is disposed on an upper deck 15 of an upper floor.

A table lifter 19 is disposed between rearward side of the moving shuttle 13 and the upper deck 15, and the lifter 19 transports the moving carts 3 from the process line 11 on a bottom process floor to the upper deck 15 of an upper floor.

A traverse 21 is disposed on the rearward side of the upper deck 15 and is connected to the moving cart return line 17. The traverse 21 transports the moving cart 3 transported from the process line 11 by the table lifter 19 to the moving cart return line 17.

A multi moving cart storage unit 31 is disposed on a forward side of the process line 11 and the moving cart return line 17, and the multi moving cart storage unit 31 loads the moving cart 3 transported by the moving cart return line 17 and suitably supplies the moving cart 3 to the process line 11. The multi moving cart storage unit 31 has a space for loading the moving carts 31 and multi moving cart storage unit 31 may have second or third floor. The moving carts 3 may move up and down or from side to side in a multi direction manner in the multi moving cart storage unit 31, and can be transported to the process line 11.

However, this type of conventional moving cart system requires multiple floors, a table lifter 19, and a side to side multi moving cart storage unit 31 in order to operate properly. Thus, the conventional moving cart system is complicated due to its large number of components and its size.

Also, the multi-direction, side to side, multi moving cart storage 31 of the conventional moving cart system has a particularly complicated configuration for supplying and storing the moving cart 3. And thus, requires significant amount of time for supplying and storing the moving cart 3.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a moving cart system which is suitably configured on one floor for supplying and storing a moving cart without a lifter, multiple floors and multi moving cart storage units.

Preferably, a moving cart system according to an exemplary embodiment of the present invention may include a moving cart main line which is suitably disposed along process portions and on which a moving cart is transferred along a positive length direction of the moving cart main line, a moving cart return line which is suitably disposed parallel with the moving cart main line and on which the moving cart is preferably transpired along a negative length direction of the moving cart return line, traverses which are disposed for connecting a front and a rear of the moving cart main line and the moving cart return line and a plurality of storage units which are suitably disposed perpendicular to the moving cart return line in predetermined intervals along length direction of the moving cart return line for storing the moving cart, wherein the moving cart may moves along the plurality of storage units.

In preferred embodiments of the invention, the moving cart main line may preferably be divided into a front and a rear portion (end sections) of the moving cart main line and a middle section between the end sections. The moving cart main line may suitably include a first base frame disposed along the process portions, process rails disposed on both sides of the first base frame and a shuttle plate suitably disposed between the process rails of the middle section.

In preferred embodiments, the moving cart system may further include a shuttle driving unit which is disposed on the middle section of the moving cart main line. Preferably, the shuttle driving unit may include a mounting frame suitably disposed on the first base frame, a first drive motor suitably disposed on the mounting frame, a pinion connected with the first drive motor and suitably engaged with a rack disposed under the shuttle plate and a plurality of guide rollers suitably disposed on the mounting frame through a mounting bracket and configured to guide forward and rearward movement of the shuttle plate.

Preferably, the moving cart system may further include a hooking unit which is suitably disposed on the shuttle plate and controlling movement of the moving cart. The hooking unit may include a hooking cylinder disposed on the shuttle plate, a hooking pin disposed at an end of a driving rod of the hooking cylinder and a hydraulic supplier configured to supply hydraulic pressure to the hooking cylinder.

In preferred embodiments of the present invention, the moving cart system may further include a cart positioning unit, which is preferably disposed within the moving cart main line corresponding to the traverses, and preferably attached to the moving cart return line corresponding to each cart storage, and wherein the cart positioning unit arranges positions of the moving cart, a first stopping unit which is suitably mounted to the moving cart main line and limits movement of the moving cart along positive length direction of the moving cart main line, a second stopping unit which is suitably mounted to the moving cart main line, and correspond to the traverses, and limits movement of the moving cart along length direction of the traverses and a third stopping unit which is suitably mounted to the moving cart return line correspond to each storage and limits movement of the moving cart along length direction of the moving cart return line. Preferably, the moving cart system may further include a first moving unit which is suitably disposed on the end sections of the moving cart main line and is connected with each of the traverses for the moving cart to be transported along length direction of the traverses.

In other preferred embodiments, the first moving unit may include a pair of first mounting plates that are suitably disposed, corresponding to the traverse, at least one the first rollers disposed on the first mounting plate, and preferably to be suitably rotated to the length direction of the traverse, a first guide rail suitably disposed on the first mounting plate, a second drive motor suitably disposed on the first base frame, first reduction gears suitably mounted to the first base frame and connected to the second drive motor, a first power delivery shaft suitably connecting the first reduction gears and the first roller and a plurality of the first elevating cylinders suitably mounted to the first base frame correspond to the first mounting plate and including a driving rod connected to the first mounting plate.

Preferably, the moving cart system may further include a return rail that is suitably mounted to a second base frame configured to the moving cart return line and second moving units suitably disposed along the moving cart return line for the moving cart to be transported along the moving cart return line.

In related embodiments, the second moving unit may preferably include a third drive motor suitably mounted to the second base frame, a plurality of the first gear boxes arranged along the second base frame, a second roller suitably mounted to an end of the first gear box for rotating to the length direction of the moving cart return line, and a second power delivery shaft connecting the third drive motor and the first gear boxes.

Preferably, the moving cart system may further include a third moving unit that is suitably mounted to the moving cart return line to be connected with the storage for the moving cart to be transported along the length direction of the moving cart return line; and a fourth moving unit that is suitably disposed to the storage unit for the moving cart to be transported along the storage.

Preferably, the third moving unit may include a pair of the second mounting plate mounted to the moving cart return line correspond to each storage, at least one the third roller suitably disposed on the second mounting plate for rotating along the storage direction, a second guide rail suitably mounted to the second mounting plate correspond to the storage, a second gear box mounted to the second base frame, a third power delivery shaft connecting the second gear box and the third roller and a second elevating cylinder disposed on the second base frame and including a driving rod connected to the second mounting plate.

Preferably, the storage may further include a third guide rail which is suitably mounted to a third base frame configure to the storage for the moving cart to be transported along the storage, wherein the fourth moving unit may include a fourth drive motor mounted to the third base frame, a third gear box mounted to the third base frame, a fourth roller disposed for rotating along the storage length direction and a fourth power delivery shaft connecting the fourth drive motor, the third gear box and the second gear box.

Preferably, the front traverse may further include a third guide rail to transport the moving cart from a front side of the moving cart return line to a front side of the moving cart main line. The third guide rail may be disposed on both sides of a fourth base frame embodied as the front traverse.

Preferably, the rear traverse may further include a fourth guide rail to transport the moving cart from a rear side of the moving cart main line to a rear side of the moving cart return line. The fourth guide rail may be disposed on both sides of a fifth base frame configured as the rear traverse.

Preferably, the moving cart system may further include a fifth moving unit which is suitably disposed on the traverse to transport the moving cart along the traverse. The fifth moving unit may include a fifth drive motor suitably mounted to the fourth and the fifth base frames, second reduction gears suitably disposed on the fourth and the fifth base frames and connected to the fifth drive motor, a fourth gear box suitably connected to the second reduction gears, a fifth roller suitably attached to the fourth gear box for rotating along length direction of the traverse and a fifth power delivery shaft suitably connecting the second reduction gears and the fourth gear box.

As described above, the moving cart system according to an exemplary embodiments of the present invention may preferably be configured on one floor for supplying and storing a moving cart without a lifter, multiple floors and multi moving cart storage units.

Preferably, according to the exemplary embodiments, the moving cart system has a simple design that is reduced in size. Thus, as a result, the overall cost of the equipment can be reduced as well.

Further, the moving cart system according to preferred exemplary embodiments of the present invention may reduce the amount of time required for supplying and storing a moving cart so that the rate of operation can be suitably increased.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

<Description of Reference Numerals Indicating Primary Elements in the Drawings>

| | |
|---|---|
| 100: moving cart system | 110: moving cart main line |
| 111: end section | 113: middle section |
| 115: first base frame | 117: process rail |
| 119: shuttle plate | 120: shuttle driving unit |
| 121: mounting frame | 123: first drive motor |
| 124: coupler | 125: pinion |
| 126: rack | 127: guide roller |
| 128: mounting bracket | 130: hooking unit |
| 131: hooking cylinder | 132: driving rod |
| 133: hooking pin | 140: first cart positioning unit |
| 150: first stopping unit | 160: second stopping unit |
| 161: stopper | 170: first moving unit |
| 171: first mounting plate | 173: first roller |
| 175: first guide rail | 177: second drive motor |
| 179: first decelerator | 181: first power delivery shaft |
| 183: first elevating cylinder | 210: moving cart return line |
| 211: second base frame | 213: return rail |
| 220: second cart positioning unit | 230: third stopping unit |
| 231: stopper | 240: second moving unit |
| 241: third drive motor | 243: first gear box |
| 245: second roller | 247: second power delivery shaft |
| 250: third moving unit | 251: second mounting plate |
| 253: third roller | 255: second guide rail |
| 257: second gear box | 259: third power delivery shaft |
| 261: second elevating cylinder | 310: first traverse |
| 311: fourth base frame | 313: third guide rail |
| 320: second traverse | 321: fifth base frame |
| 323: fourth guide rail | 350: fifth moving unit |
| 351: fifth drive motor | 353: second decelerator |
| 355: fourth gear box | 357: fifth roller |
| 359: fifth power delivery shaft | 410: storage |
| 411: third base frame | 413: third guide rail |
| 420: fourth moving unit | 421: fourth drive motor |
| 423: third gear box | 425: fourth roller |
| 427: fourth power delivery shaft | |

DETAILED DESCRIPTION OF THE EMBODIMENTS

In one aspect, the present invention features a moving cart system comprising a moving cart main line, a moving cart return line, traverses, and, a plurality of storage units. The moving cart main line may be disposed along various process portions, and may be transpired along a positive length direction of the moving cart main line.

In a related embodiment, the moving cart return line may be disposed parallel with the moving cart main line, and the moving cart is transpired along a negative length direction of the moving cart return line.

In another embodiment, the traverses are disposed to embody a front and a rear portion of the moving cart main line and the moving cart return line.

In a related embodiment, the plurality of storage units are disposed perpendicular to the moving cart return line. The plurality of storage units may also be disposed in predetermined intervals along the length direction of the moving cart return line for storing the moving cart.

In another embodiment, the moving cart moves along with the plurality of storage units.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
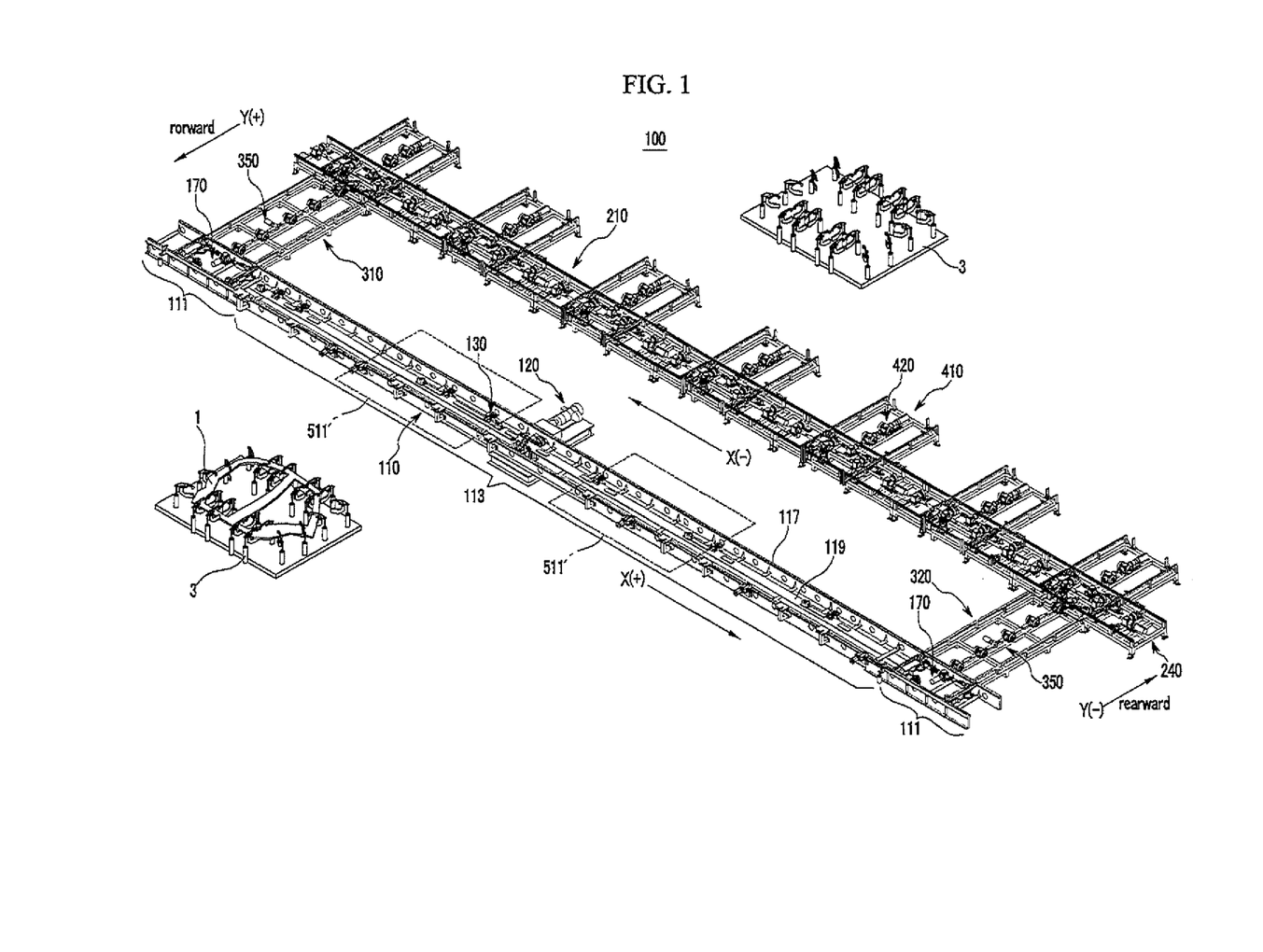
FIG. 1 is a drawing showing an exemplary layout of a moving cart system according to a preferred embodiment of the present invention.

FIG. 1 is a drawing showing layout of a moving cart system according to an exemplary embodiment of the present invention. In a preferred embodiment of the present invention, for example referring to the drawing of FIG. 1, an exemplary moving cart system 100 according to a preferred embodiment of the present invention is suitably applied to a combined production line of many different kinds of vehicle systems, in which assemblies assembly panels (e.g., side assembly panels) in one line by a suitable welding process. Preferably, the side assembly panels are assembled panels made of part elements 1 such as outer panels, inner panels, supporting panels and so on, by welding process.

In further embodiments, the moving cart system 100 preferably includes a moving cart 3 for suitably transferring the part elements 1 to process portions 511. In preferred embodiments, in the process portions 511, welding robots (not shown) execute spot welding of the part elements. Preferably, the moving cart system 100 suitably includes a moving cart main line 110, a moving cart return line 210, traverses 310 and 320 and storage units 410.

According to certain preferred embodiments, for example as shown in the drawing, direction from forward to rearward of the moving cart main line 110 will preferably be defined as X(+) and the opposite direction will preferably be defined as X(−). According to further related embodiments, direction from forward of the moving cart return line 210 to forward of the moving cart main line 110 will preferably be defined as Y(+) and the opposite direction will preferably be defined as Y(−). And the lines X and Y are preferably perpendicular.

According to other preferred embodiments, the moving cart main line 110 is suitably disposed along the X(+) direction and the moving cart return line 210 is suitably disposed along X(−) direction parallel with the moving cart main line 110.

Preferably, the traverses 310 and 320 respectively suitably connect the forward and rearward portions of the moving cart main line 110 and the moving cart return line 210, and in exemplary preferred embodiments and hereinafter the forward traverse 310 will be suitably indicated as a first traverse and the rearward traverse 320 will be suitably indicated as a second traverse.

Preferably, the first traverse 310 and the second traverse 320 are suitably disposed along the Y direction. Further, the storage units 410 are connected to moving cart return line 210 and suitably disposed along the Y direction. In certain preferred embodiments, the moving cart main line 110 preferably functions as a main shuttle line for transferring the moving cart 3 along the X(+) direction.

In other certain preferred embodiments, the moving cart main line 110 is suitably divided into end sections 111 (e.g., a front and a rear portion of the moving cart main line 110) and a middle section 113 between the end sections 111.

Figure 2A:
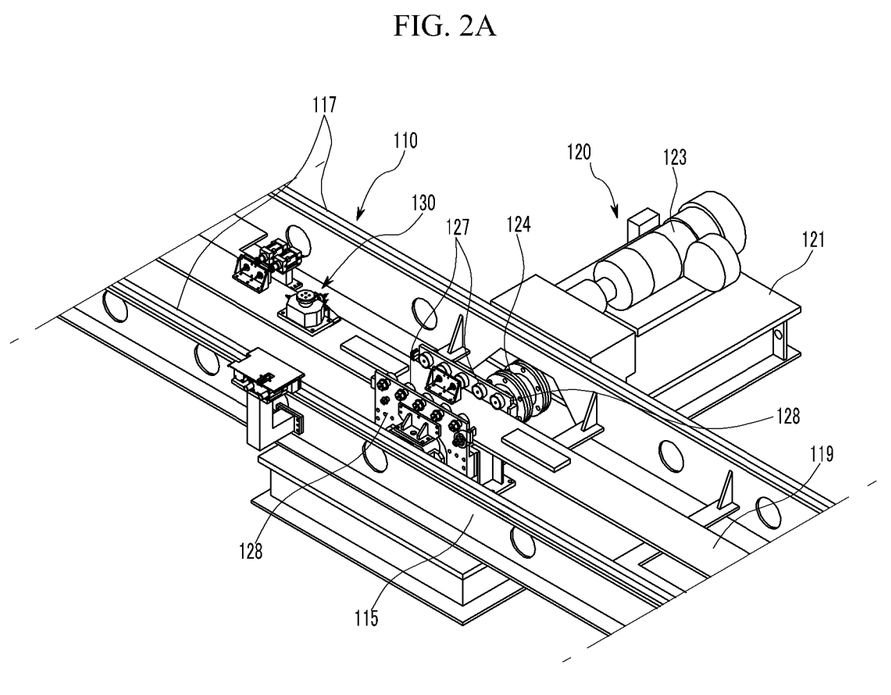
FIG. 2A to FIG. 2C are drawings showing an exemplary shuttle driving unit of the moving cart system according to a preferred embodiment of the present invention.

In further preferred embodiments, the moving cart main line 110, for example referring to FIG. 2A, preferably includes a first base frame 115, a process rail 117 and a shuttle plate 119. Preferably, the first base frame 115 is suitably disposed in the X direction along the process portions 511.

Preferably, the process rail 117 for transferring the moving cart 3 is suitably disposed on the first base frame 115 along the X direction. The shuttle plate 119 for transferring the moving cart 3 along the X(+) direction is suitably disposed between the process rails 117 of the middle section 113 and is movable along the first base frame 115.

Figure 2B:
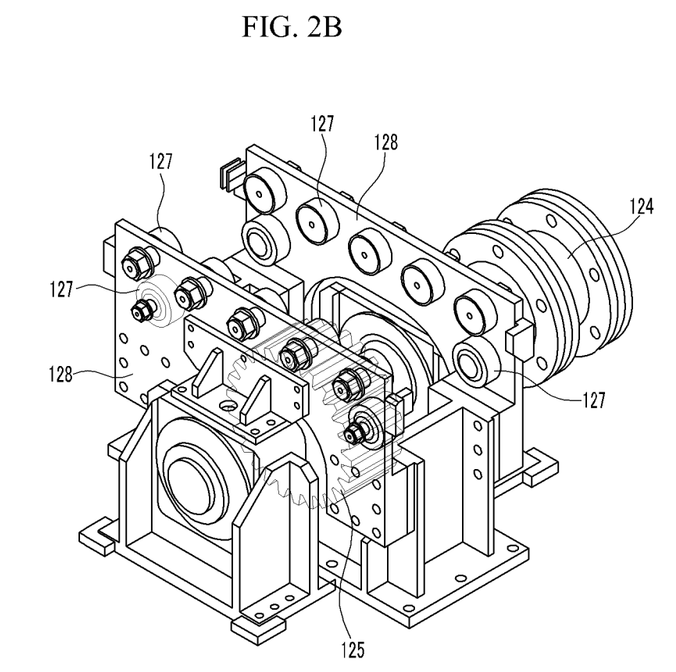
Figure 2C:
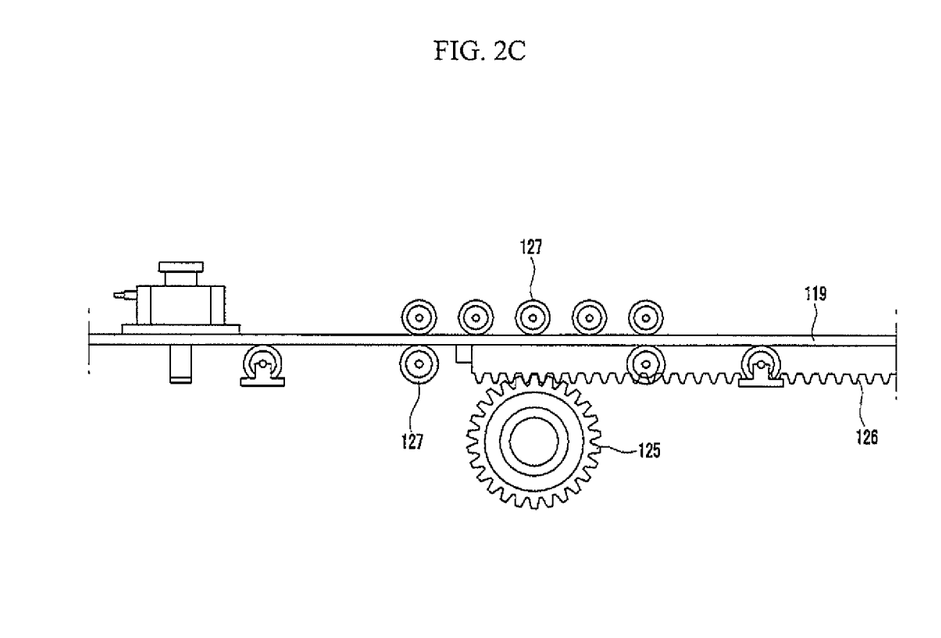

According to further preferred embodiments, a shuttle driving unit 120, as shown in FIG. 2A to FIG. 2C, is suitably disposed within the middle section 113 of the moving cart main line 110 for supplying driving torque to the shuttle plate 119. The shuttle driving unit 120 suitably includes a mounting frame 121, a first drive motor (e.g., a drive motor of the shuttle driving unit) 123, a pinion 125 and a plurality of guide rollers (e.g., guide rollers of the shuttle driving unit) 127.

Preferably, the mounting frame 121 is connected to the first base frame 115 and the first drive motor 123 is mounted to mounting frame 121. (As shown in FIG. 2A)

Preferably, the pinion 125 is suitably connected to the first drive motor 123 and engaged with a rack 126 which is connected under the shuttle plate 119. The guide rollers 127 are suitably positioned on both ends of the shuttle plate 119 and the guide rollers 127 are mounted to the mounting frame 121 by a mounting bracket 128 connected to the mounting frame 121. (As shown in FIG. 2A). The guide rollers 127 guide forward and rearward movement of the shuttle plate 119 along the moving cart main line 110.

According to further embodiments, a drive shaft (not shown) of the first drive motor 123 is suitably connected to a coupler 124 and rotatably supported by the mounting bracket 128, and the pinion 125 is suitably connected to drive shaft.

Figure 3:
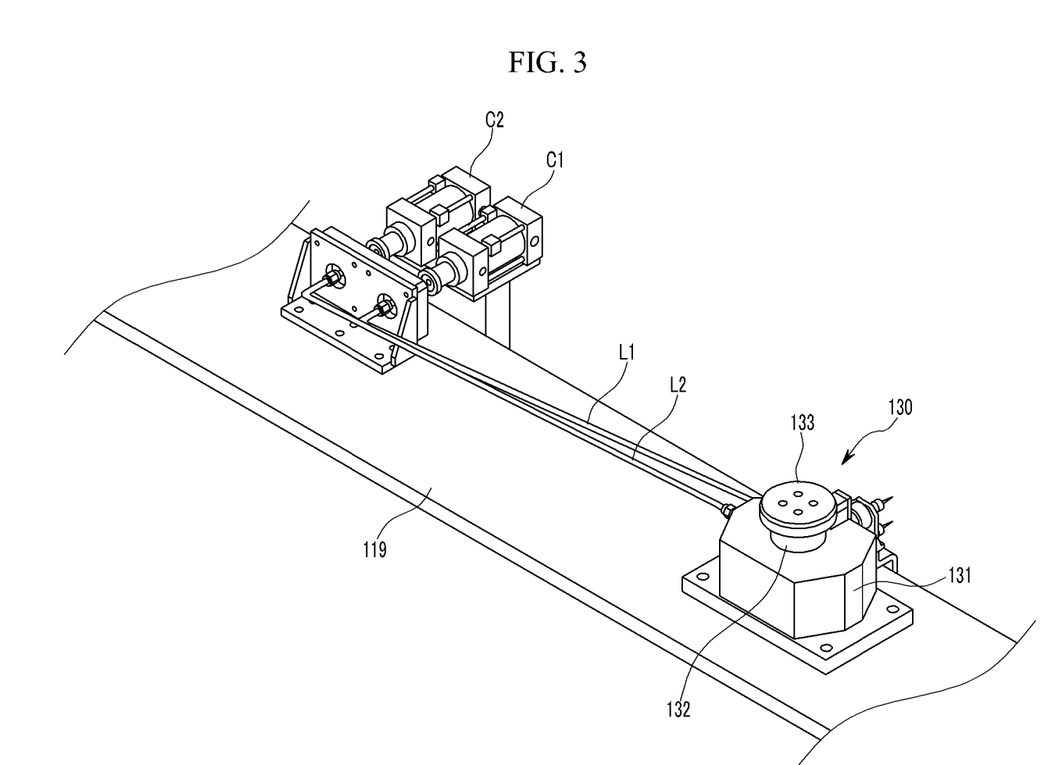
FIG. 3 is a drawing showing an exemplary hooking unit of the moving cart system according to another preferred embodiment of the present invention.

Further, in other preferred embodiments, a hooking unit 130, as shown in FIG. 3, is suitably mounted to the shuttle plate 119 for hooking the moving cart 3 and transferring the moving cart 3 with the shuttle plate 119. The hooking unit 130 includes a hooking cylinder 131, a hooking pin 133 and a pair of hydraulic supplier L1 and L2. The hooking cylinder 131 may be suitably mounted to on the shuttle plate 119 and a driving rod 132, operated by the hydraulic supplier L1 and L2, is suitably connected to the hooking cylinder 131. The hooking pin 133 may be suitably configured to an end of the driving rod 132 of the hooking cylinder 131.

In preferred embodiments, the hydraulic supplier L1 and L2 are suitably connected to supplying cylinders C1 and C2 for supplying operating hydraulic pressure to the hooking cylinder 131.

The hooking pin 133 selectively hooks the moving cart 3 according to supplying operating hydraulic pressure from the hydraulic supplier L1 and L2 to the hooking cylinder 131.

Figure 4:
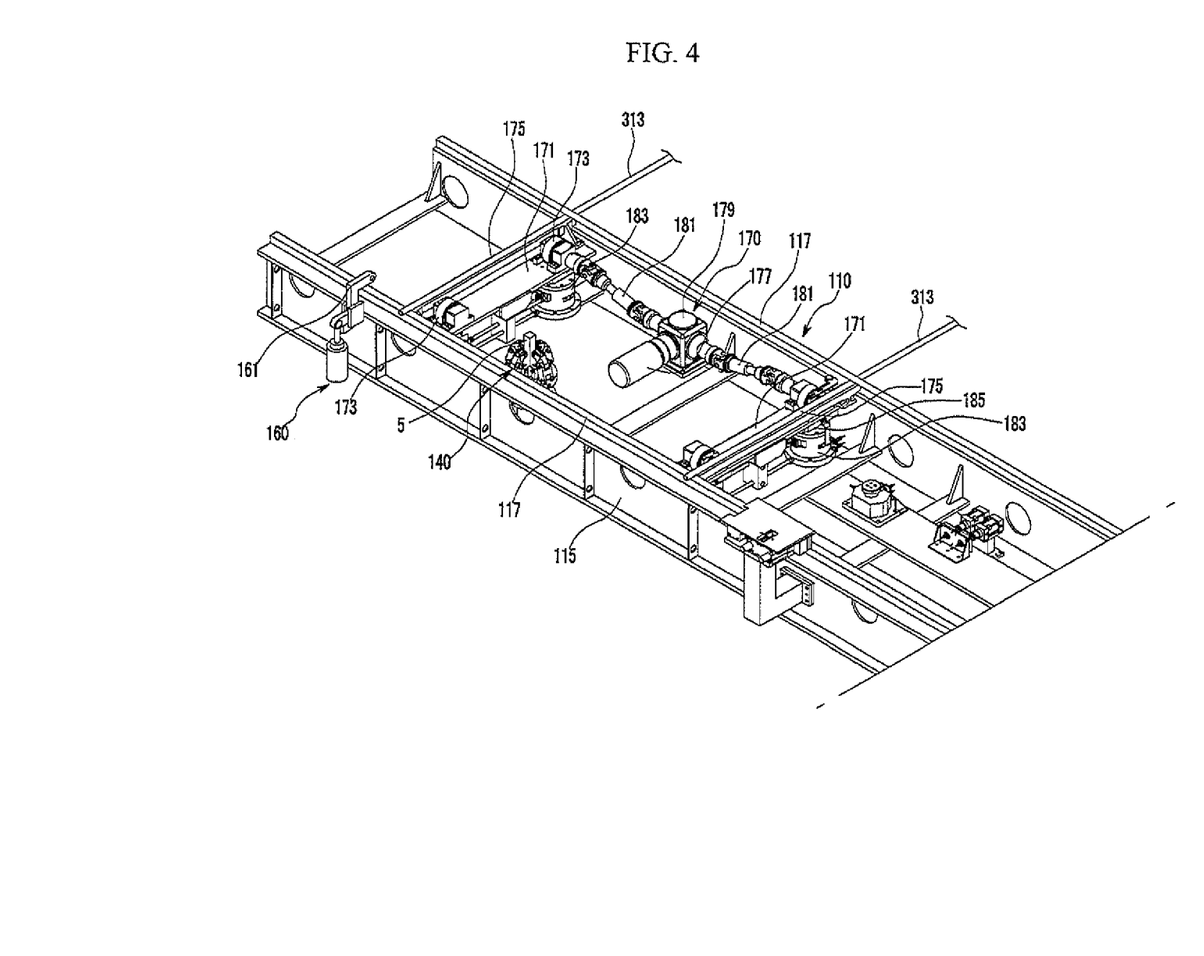
FIG. 4 and FIG. 5 are drawings showing an exemplary moving cart main line of the moving cart system according to a preferred embodiment of the present invention.

In certain preferred embodiments, a first cart positioning unit 140, for example as shown in FIG. 4, is suitably mounted to the moving cart main line 110 for arranging positions of the moving cart 3. The first cart positioning unit 140 is suitably mounted to the end section 111 corresponding to each first and the second traverse 310 and 320. The first cart positioning unit 140 may suitably arrange position of the moving cart 3 along the X and Y direction at the same time on the process rail 117 of the moving cart main line 110. Preferably, the first cart positioning unit 140 variably clamps a positioning protrusion 5 formed under the moving cart 3 by suitable operation of operating cylinder.

Figure 5:
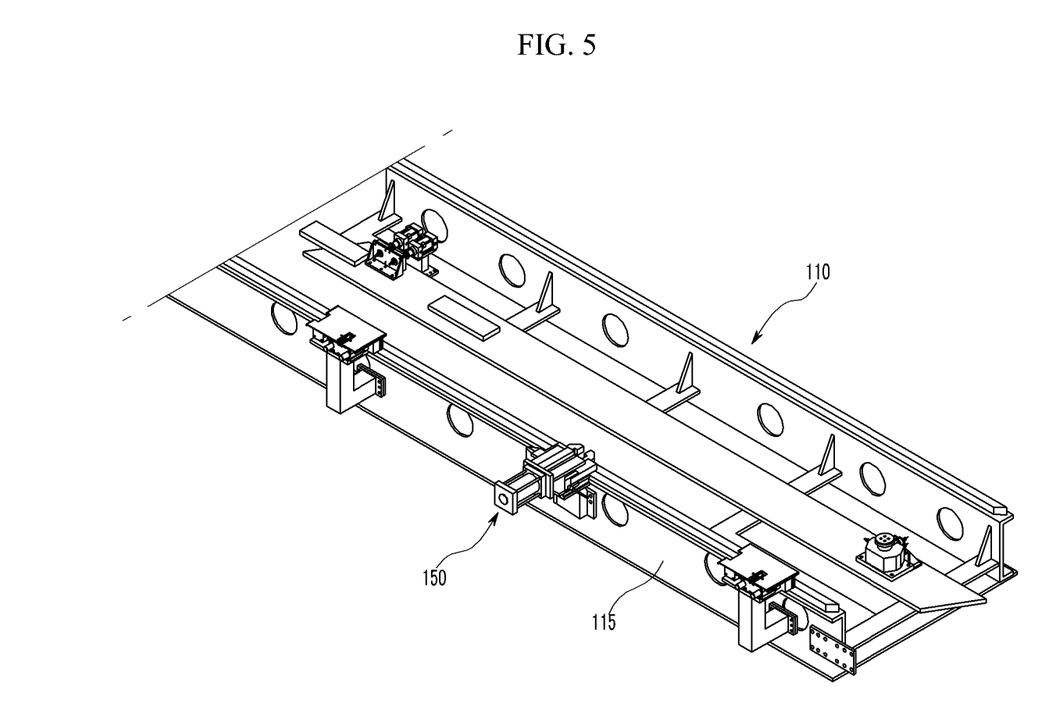

A first stopping unit 150, as shown in FIG. 5, is suitably mounted to the moving cart main line 110 and the first stopping unit 150 selectively limits movement to the X(+) direction of the moving cart 3. Preferably, the first stopping units 150 are suitably disposed on the first base frame 115 of the moving cart main line 110 at regular intervals. The first stopping unit 150 may clamp the moving cart 3 by operation of operating cylinder.

In certain exemplary embodiments, a second stopping unit 160, for example as shown in FIG. 4, is suitably disposed within the moving cart main line 110.

In related embodiments, the second stopping unit 160 may suitably limit movement to the Y direction of the moving cart 3 transported from the first traverse 310 to moving cart main line 110 and may limit movement to the Y direction of the moving cart 3 transported from moving cart main line 110 to the second traverse 320 (referring to FIG. 1).

Preferably, the second stopping unit 160 is suitably mounted to the end section 111 of the moving cart main line 110 corresponding to each first and the second traverse 310 and 320.

In certain exemplary embodiments, the second stopping unit 160 is preferably mounted to the first base frame 115 of the moving cart main line 110 and includes a stopper 161 for limiting movement to the Y(±) direction of the moving cart 3 by operation of operating cylinders.

The first traverse 310 includes a base frame of the first traverse (a fourth base frame) 311 and guide rails of the first traverse (third guide rails) 313 connected on the base frame of the first traverse 311 of which the moving cart 3 is transferred along thereon.

The second traverse 320 includes a base frame of the second traverse (fifth base frame) 321 and guide rails of the second traverse (fourth guide rails) 323 connected on the base frame of the second traverse 321 of which the moving cart 3 is transferred along thereon.

The moving cart return line 210 includes a base frame of the moving cart return line (a second base frame) 211 and guide rails of the moving cart return line (return rails) 213 connected on the base frame of the moving cart return line 211 of which the moving cart 3 is transferred along thereon.

According to certain preferred embodiments of the invention, a first moving unit 170, for example as shown in FIG. 4, is suitably disposed for transferring the moving cart 3 from the first traverse 310 to the moving cart main line 110 and for transferring the moving cart 3 from the moving cart main line 110 to the second traverse 320. Preferably, the first moving unit 170 is suitably attached to each end section 111 of the moving cart main line 110 and connected with the first and the second traverse 310 and 320 respectively.

In certain exemplary embodiments of the present invention, the first moving unit 170 includes a pair of the first mounting plate (a mounting plate of first moving unit) 171, a first roller (a roller of first moving unit) 173, a first guide rail (a guide rail of first moving unit) 175, a second drive motor (a drive motor of first moving unit) 177, first reduction gears (reduction gears of the first moving unit) 179, a first power delivery shaft (a power delivery shaft of first moving unit) 181 and a first elevating cylinder (an elevating cylinder of first moving unit) 183.

In preferred embodiments, the first mounting plates 171 are suitably disposed between the process rail 117 of the moving cart main line 110 and preferably correspond to the first and the second traverse 310 and 320. Preferably, the first rollers 173 are suitably disposed on the first mounting plate 171 rotatable in the Y direction.

Preferably, the first guide rails 175 are suitably disposed where the traverses 310 and 320 are connected and parallel to the third guide rails. Preferably, the second drive motor 177 is suitably mounted on the first base frame 115, and the first reduction gears are suitably mounted to the first base frame 115 and connected to the second drive motor 177. The first power delivery shaft 181 is suitably connected to the first reduction gears 179 and the first roller 173.

Preferably, the first power delivery shaft 181 suitably receives driving torque of the second drive motor 177 through the first reduction gears 179 and suitably supplies such to the first roller 173.

According to certain exemplary embodiments of the present invention, the first elevating cylinders 183 are suitably mounted on the first base frame 115 corresponding to the first mounting plate 171 and a driving rod 185 is suitably connected to a lower part of first mounting plate 171.

Preferably, the first elevating cylinders 183 drive the driving rod 185 up and down so that the first mounting plate 171 moves up and down for selectively forming a straight line by the guide rails of the first moving unit 175 and the guide rails of each first traverse 313 and 323.

Figure 6:
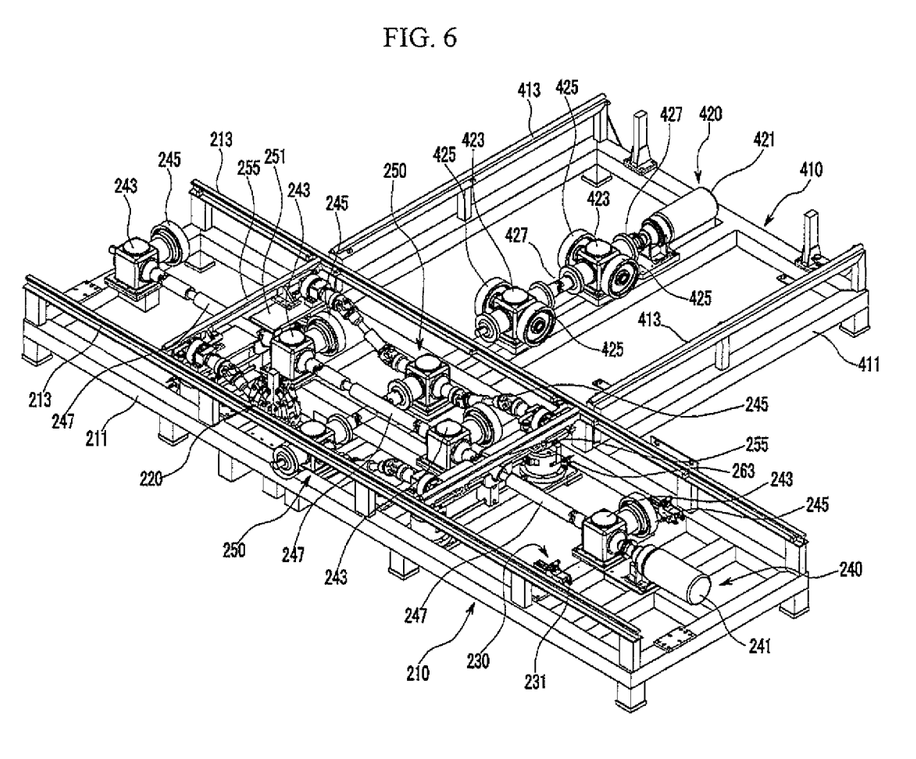
FIG. 6 is a drawing showing an exemplary moving cart return line and a storage unit of the moving cart system according to another preferred embodiment of the present invention.

In further preferred embodiments of the invention, a second cart positioning unit 220, for example as shown in FIG. 6, is suitably attached to the moving cart return line 210 for arranging the moving cart 3, and the second cart positioning unit 220 preferably includes a second base frame 211 suitably disposed along the X direction, a return rail 213 parallel with the second base frame 211.

Preferably, the second cart positioning unit 220 suitably arranges the moving cart 3, which is transported from the storage 410 to the moving cart return line 210 and from the moving cart return line 210 to the storage 410. The second cart positioning unit 220 is suitably attached to the second base frame 211 correspond to the storage 410. According to preferred embodiments of the present invention, a third stopping unit 230 is suitably mounted to the moving cart return line 210 corresponding to the storage 410 for limiting X direction movement of the moving cart 3. The third stopping unit 230 is suitably mounted to the second base frame 211 of the moving cart return line 210 and a stopper 231 for limiting X direction movement of the moving cart 3 by operation of an operating cylinder is mounted to the third stopping unit 230.

Preferably, a second moving unit 240 is suitably attached to the moving cart return line 210 for transferring the moving cart 3 to the X(−) direction. The second moving unit 240 is suitably mounted to the second base frame 211 of the moving cart return line 210 at regular intervals. The second moving unit 240 includes a third drive motor (a drive motor of the second moving unit) 241, a first gear box (a gear box of the second moving unit) 243, a second roller (a roller of the second moving unit) 245 and a second power delivery shaft (a power delivery shaft of the second moving unit) 247.

Preferably, the third drive motor 241 is suitably mounted to the second base frame 211 and the first gear box 243 is configured to the second base frame 211. The second roller 245 is suitably rotatable in the X direction and connected to the first gear box 243.

According to further preferred embodiments of the present invention, the second power delivery shaft 247 suitably connects the third drive motor 241 and the first gear boxes 243, and the second power delivery shaft 247 suitably receives driving torque of the third drive motor 241 and supplies power to the second roller 245 through the first gear boxes 243.

In further related embodiments, a third moving unit 250 is suitably disposed for transferring the moving cart 3 from the storage 410 to the moving cart return line 210 along the Y(+) direction and from the moving cart return line 210 to the storage 410 along the Y(−) direction. Preferably, the third moving unit 250 is suitably mounted to moving cart return line 210 to be preferably connected to the storage 410.

Figure 7:
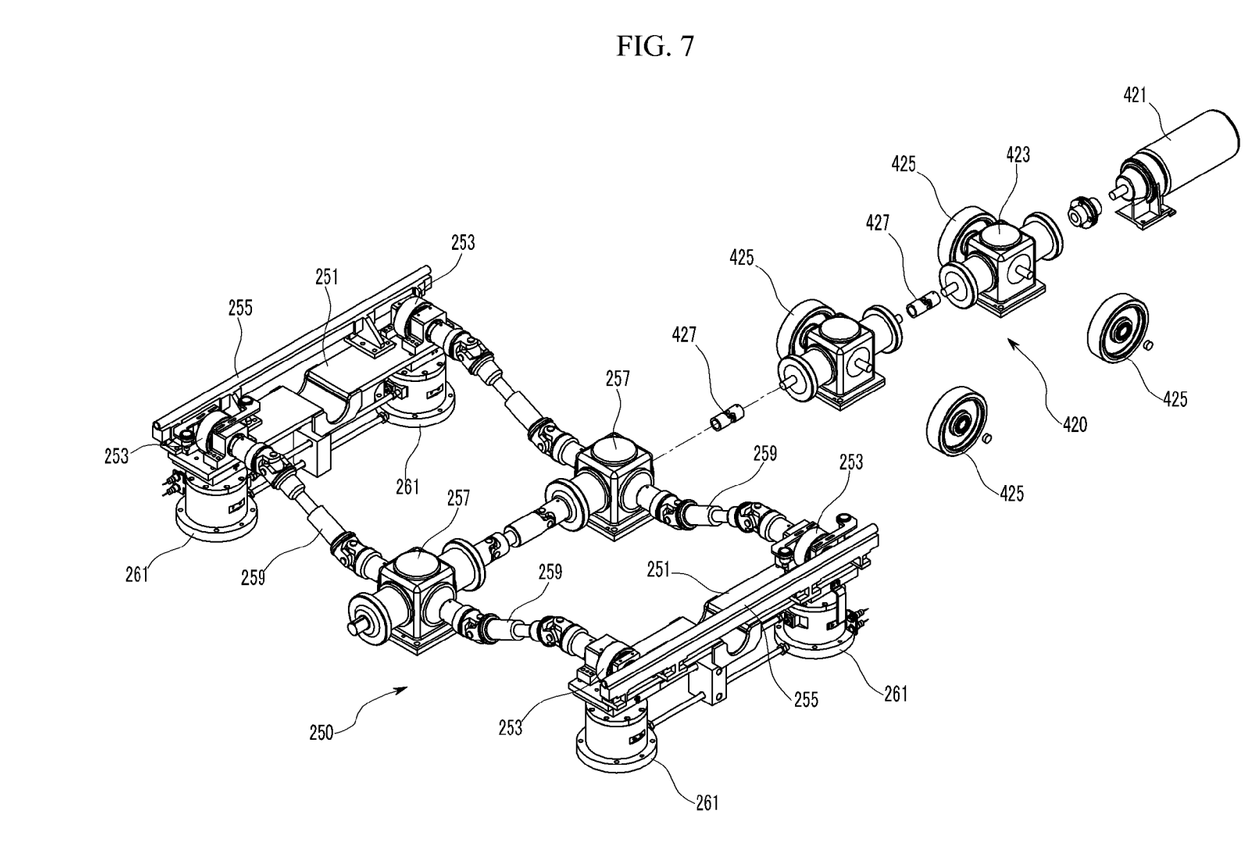
FIG. 7 is a drawing showing a third and fourth moving unit of the moving cart system according to an exemplary embodiment of the present invention.

Preferably, the third moving unit 250, for example as shown in FIG. 6 and FIG. 7, includes second mounting plates (mounting plates of the third moving unit) 251, third rollers 253, second guide rails (guide rails of the third moving unit) 255, second gear boxes (gear boxes of the third moving unit) 257, third power delivery shaft (power delivery shaft of the third moving unit) 259 and second elevating cylinders (elevating cylinders of the third moving unit) 261.

Preferably, the second mounting plate 251 is disposed between the return rails 213 of the moving cart return line 210 correspond to the storage unit 410. The third roller 253 is suitably disposed on the second mounting plate 251 rotatable to the Y direction. The second guide rail 255 corresponds to the cart storage unit 410 and is suitably disposed on the second mounting plate 251 along the Y direction.

The second gear box 257 is suitably mounted to the second base frame 211 between the mounting plates 251, and the third power delivery shaft 259 suitably connects the second gear box 257 and the third roller 253.

According to further preferred embodiments of the present invention, the second elevating cylinder 261 is suitably mounted to the second base frame 211 corresponding to the second mounting plate 251 and driving rods of the third moving unit 263 are suitably disposed for connecting under the second mounting plate 251.

According to further preferred embodiments, the second elevating cylinders 261 suitably drive the driving rod of the third moving unit 263 up and down so that the second mounting plate 251 can suitably be moved up and down for selectively forming a straight line by the guide rails of the third moving unit 255 and the storage guide rails 313 and 323. Preferably, the end storage units 410 of the moving cart return line 210 and the first and the second traverse 310 and 320 preferably form a straight line respectively.

According to further embodiments, preferably, in the storage unit 410, a third base frame (a storage base frame) 411 is suitably disposed along the Y direction and third guide rails (storage guide rails) 413 are suitably disposed parallel with the third base frame 411.

According to other further embodiments, preferably in the storage unit 410, for example as shown in FIG. 6 and FIG. 7, a fourth moving unit 420 is suitably disposed for transferring the moving cart 3 to the Y(±) direction.

Preferably, the fourth moving unit 420 includes a fourth drive motor (storage drive motor) 421, third gear boxes (storage gear boxes) 423, fourth rollers 425 (storage rollers) and fourth power delivery shafts (storage power delivery shafts) 427.

Preferably, the fourth drive motor 421 is suitably mounted to the third base frame 411 and the third gear boxes 423 are suitably mounted to the third base frame 411 corresponding to the fourth drive motor 421 at regular intervals.

Preferably, the fourth rollers 425 are suitably disposed on the third gear boxes 423 rotatable to the Y direction.

Preferably, the fourth power delivery shafts 427 suitably connect the fourth drive motor 421, the third gear boxes 423 and the second gear boxes 257 of the third moving unit 250.

Preferably, the fourth power delivery shafts 427 supply driving torque of the fourth drive motor 421 to the fourth rollers 425 through the third gear boxes 423 and also suitably supply the driving torque to the third rollers 253 through the second gear boxes 257 of the third moving unit 250.

Preferably, the first traverse 310, as shown in FIG. 1, is connected in a position that is suitably forward of the moving cart main line 110 and the moving cart return line 210.

In further related embodiments, through the first traverse 310, the moving cart 3 is suitably transported from the forward of the moving cart return line 210 to the moving cart main line 110 along the Y(+) direction.

Preferably, the fourth base frame (the base frame of the first traverse) 311 is suitably mounted to the first traverse 310 and the third guide rail (the guide rail of the first traverse) 313 is suitably disposed parallel with the fourth base frame 311.

Preferably, the second traverse 320 suitably connects rearward of the moving cart main line 110 and the moving cart return line 210.

In certain exemplary embodiments, through the second traverse 320, the moving cart 3 is suitably transported from the rearward of the moving cart main line 110 to the moving cart return line 210 along the Y(−) direction.

Preferably, the fifth base frame (the base frame of the second traverse) 321 is suitably mounted to the second traverse 320 and the fourth guide rail (the guide rail of the second traverse) 323 is suitably disposed parallel with the fifth base frame 321.

Figure 8:
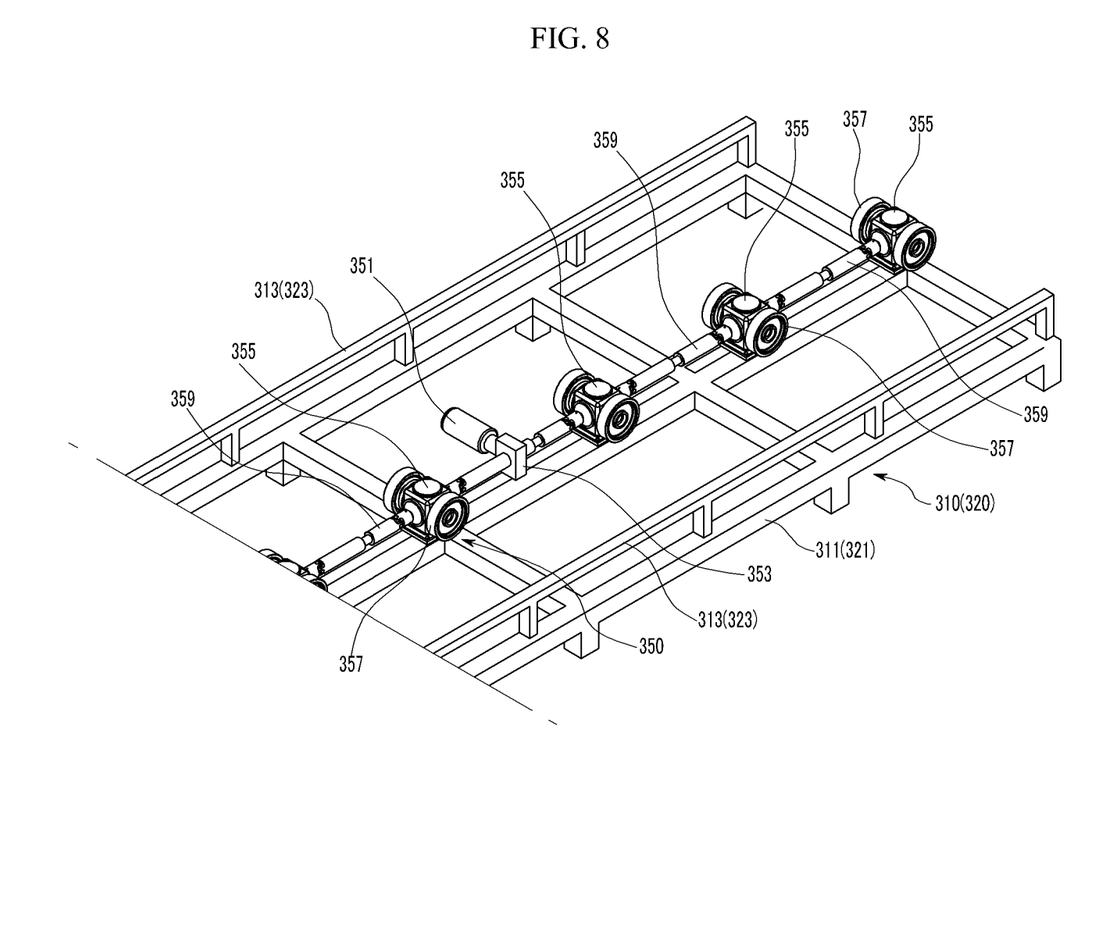
FIG. 8 is a drawing showing a traverse of the moving cart system according to an exemplary embodiment of the present invention.

Preferably, a fifth moving unit 350, for example as shown in FIG. 8, is suitably mounted to the first and the second traverse 310 and 320 for transferring the moving cart 3 to the Y(±) direction.

According to further embodiments, the fifth moving unit 350 preferably includes a fifth drive motor (a drive motor of the fifth moving unit) 351, second reduction gears (reduction gears of the fifth moving unit) 353, fourth gear boxes (gear boxes of the fifth moving unit) 355, fifth rollers (rollers of the fifth moving unit) 357 and the fifth power delivery shafts (power delivery shafts of the fifth moving unit) 359.

Preferably, the fifth drive motors 351 are suitably mounted to the fourth and the fifth base frame 311 and 321.

Preferably, the second reduction gears 353 are suitably connected to the fifth drive motor 351 and mounted to the fourth and the fifth base frame 311 and 321.

Preferably, the fourth gear boxes 355 are suitably mounted to the fourth and the fifth base frame 311 and 321 along the Y direction at regular intervals.

Preferably, the fifth roller 357 is suitably mounted to the fourth gear box 355 rotatable to the Y direction.

According to other further embodiments, fifth power delivery shaft 359 connects the second reduction gears 353 and the fourth gear boxes 355 and the fifth power delivery shaft 359 receives driving torque of the fifth drive motor 351 and supplies the fifth roller 357 through the second reduction gears 353 and the fourth gear boxes 355.

Hereinafter, operations of the moving cart system 100 according to an exemplary embodiment of the present invention are described.

According to preferred exemplary embodiments of the present invention, the moving cart 3 may be variable in scheme according to of the type of vehicle, and in further related embodiments is circulated along the system 100 according to manufacturing rate.

In exemplary embodiments of the present invention, operations regarding one moving cart 3 are explained for convenience, however the invention is not limited as such.

In a preferred embodiment, the moving cart 3 stored in the storage unit 410 is suitably transported along the Y(+) direction by the operation of the fourth moving unit 420.

Preferably, the moving cart 3 transported to the moving cart return line 210 by the operation of the fourth moving unit 420 is suitably transported to the Y(+) direction by operation of the third moving unit 250.

According to further exemplary embodiments, the moving cart 3 is suitably positioned by the operation of the second cart positioning unit 220 on the moving cart return line 210 and the X(+) direction movement of the moving cart 3 is suitably limited by the third stopping unit 230.

In preferred exemplary embodiments, the moving cart 3 is suitably transported along the moving cart return line 210 to the X(−) direction by the operation of the second moving unit 240.

Preferably, in this process, the part elements 1 is loaded to the moving cart 3 and the moving cart 3 is transported to the first traverse 310.

Preferably, when the moving cart 3 reaches the first traverse 310, the moving cart 3 is transported to the Y(+) direction from the moving cart return line 210 by the operation of the third moving unit 250.

According to other further exemplary embodiments, in this process, the moving cart 3 is preferably arranged by the operation of the second cart positioning unit 220 in the moving cart return line 210 and the movement to the X(+) direction of the moving cart 3 is suitably limited by the operation of the third stopping unit 230.

Preferably, the moving cart 3 is suitably transported to the forward of the moving cart main line 110 through the first traverse 310 by the operation of the fifth moving unit 350 as shown in FIG. 8.

In further related embodiments, the moving cart 3 is suitably transported to the Y(+) direction in the moving cart main line 110 by the operation of the first moving unit 170 and is suitably arranged by the first cart positioning unit 140, and movement of the moving cart 3 to the Y(+) direction is limited by the operation of the second stopping unit 160.

Preferably, then, the moving cart 3 is transported to the X(+) direction along the moving cart main line 110 by the shuttle plate 119.

Preferably, in this process, the moving cart 3 that is suitably hooked by the hooking unit 130 is transported with the shuttle plate 119 simultaneously.

Preferably, the shuttle plate 119 receives driving torque of the shuttle driving unit 120 and suitably transports the moving cart 3 to the X(+) direction.

Preferably, the moving cart 3 transported along the X(+) direction to the process portions 511 and the movement of the moving cart 3 is suitably limited by the operation of the first stopping unit 150 as shown in FIG. 5.

According to further exemplary embodiments, in the stationary state of the moving cart 3 by the first stopping unit 150 the welding robots (not shown) preferably do spot welding processes to the part elements 1.

In further exemplary embodiments, after finishing the spot welding processes, the limiting moving cart 3 by the first stopping unit 150 is released and then the moving cart 3 is suitably transported to the rearward of the moving cart main line 110 by the shuttle plate 119.

Preferably, the moving cart 3 reaches the second traverse 320 and then the hooking of the hooking unit 130 is suitably released and the position of the moving cart 3 is arranged by the first cart positioning unit 140 and the movement of the moving cart 3 to the Y(+) direction is limited by the second stopping unit 160.

Preferably, the moving cart 3 is transported to the second traverse 320 along the Y(−) direction by the operation of the first moving unit 170 and then in the second traverse 320, for example as shown in FIG. 8, the moving cart 3 is suitably transported to the rearward of the moving cart return line 210 along the Y(−) direction by the operation of the fifth moving unit 350.

According to further exemplary embodiments, then the moving cart 3 is suitably transported to the Y(−) direction from the rearward of the moving cart return line 210 by the operation of the third moving unit 250 and arranged by the operation of the second cart positioning unit 220 and the X(+) direction movement of the moving cart 3 is suitably limited by the operation of the third stopping unit 230. Then the moving cart 3 is transferred to the X(−) direction along the moving cart return line 210 by the operation of the second moving unit 240.

Preferably, when the moving cart 3 reaches the storage unit 410, the position of the moving cart 3 is suitably arranged by the operation of the second cart positioning unit 220 and the movement to the X(+) direction of the moving cart 3 is suitably limited by the third stopping unit 230.

According to further preferred embodiments, the moving cart 3 is suitably transported from the moving cart return line 210 to the storage unit 410 by the operation of the third moving unit 250. Preferably then, the moving cart 3 is suitably transported to the Y(−) direction by the operation of the fourth moving unit 420 and stored to the predetermined the storage unit 410.

Preferably, the moving cart system 100 according to exemplary embodiments of the present invention may be suitably configured on one floor for supplying and storing a moving cart 3 without a lifter, multi floors or multi moving cart storage units, as compared to a conventional moving cart system.

Accordingly, in the moving cart system 100, the total equipment or the arrangement of the system can be suitably simplified or minimized and the productivity of the manufacturing facility can be suitably enhanced. Further, the requirement for investment, that is the cost required for operating the system, can be reduced.

According to further exemplary embodiments, the moving interval supplying the moving cart can be suitably reduced so that the rate of the operation of the facility can be suitably increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A moving cart system comprising:
a moving cart main line including one end section, another end section and a middle section formed between each of the end sections;
a moving cart return line parallel to the moving cart main line;
a first traverse perpendicular to the moving cart main line and the moving cart return line and configured to connect the one end section of the moving cart main line and the moving cart return line and of which a moving cart is transferred from the moving cart return line to the moving cart main line via the first traverse;
a second traverse perpendicular to the moving cart main line and the moving cart return line and configured to connect the another end section of the moving cart main line and the moving cart return line, wherein the moving cart is transferred from the moving cart main line to the moving cart return line via the second traverse;
a plurality of storage units disposed perpendicular to the moving cart return line in a predetermined interval along the moving cart return line to store the moving cart, wherein the moving cart moves along the plurality of storage units; and
first moving units disposed within each end section,
wherein the moving cart main line comprises:
a base frame of the moving cart main line; and
process rails connected on the base frame of the moving cart main line, the moving cart being transferred along the process rails,
wherein the first traverse comprises:
a base frame of the first traverse; and
guide rails of the first traverse connected on the base frame of the first traverse of which the moving cart is transferred along thereon;
wherein the second traverse comprises:
a base frame of the second traverse; and
guide rails of the second traverse connected on the base frame of the second traverse of which the moving cart is transferred along thereon,
wherein the moving cart return line comprises:
a base frame of the moving cart return line; and
guide rails of the moving cart return line connected on the base frame of the moving cart return line of which the moving cart is transferred along thereon,
wherein the first moving unit comprises;
mounting plates of the first moving unit disposed parallel to each traverse;
rollers of the first moving unit disposed on each mounting plate of the first moving unit to be rotated for the moving cart to be transferred toward or from the traverse;
guide rails of the first moving unit connected on the each mounting plates of the first moving unit;
a drive motor of the first moving unit disposed on the base frame of the moving cart main line;
reduction gears of the first moving unit disposed on the base frame the moving cart main line and connected to the drive motor of the first moving unit;
power delivery shafts of the first moving unit connecting the reduction gears of the first moving unit and the rollers of the first moving unit; and
a plurality of elevating cylinders of the first moving unit connected to the base frame of the moving cart main line correspond to the first mounting plate; and
driving rods of the first moving unit connected to the mounting plate of the first moving unit and operated by each elevating cylinder of the first moving unit for moving up or down the mounting plate of the first moving unit for selectively forming a straight line by the guide rails of the first moving unit and the guide rails of each first traverse.

2. The moving cart system of claim 1, wherein the moving cart system further comprises a shuttle driving unit which is mounted to the middle section of the moving cart main line.

3. The moving cart system of claim 2,
wherein the shuttle driving unit comprises:
a shuttle plate disposed between the process rails;
a rack which is connected under the shuttle plate;
a mounting frame mounted to the base frame of the moving cart main line;
a drive motor of the shuttle driving unit mounted to the mounting frame;
a pinion which is connected with the drive motor of the shuttle driving unit and is engaged with the rack which is connected under the shuttle plate; and
guide rollers of the shuttle driving unit which are mounted to the mounting frame through a mounting bracket and guide the shuttle plate along the base frame of the moving cart main line.

4. The moving cart system of claim 1, wherein the moving cart system further comprises a hooking unit which is mounted to the shuttle plate selectively hooking the moving cart and transferring the moving cart with the shuttle plate.

5. The moving cart system of claim 4,
wherein the hooking unit comprises:
a hooking cylinder mounted to the shuttle plate;
a driving rod of the hooking cylinder operated by the hooking cylinder;
a hooking pin mounted to an end of the driving rod of the hooking cylinder; and
a hydraulic supplier which supplies hydraulic pressure to the hooking cylinder for selectively operating the driving rod of the hooking cylinder,
wherein the hooking pin selectively hooks the moving cart according to supplying operating hydraulic pressure from the hydraulic supplier to the hooking cylinder.

6. The moving cart system of claim 1, wherein the moving cart system further comprises:
second moving units mounted to the moving cart return line for the moving cart to be transferred along the moving cart return line.

7. The moving cart system of claim 6,
wherein the second moving unit comprises:
a drive motor of the second moving unit disposed within the base frame of the moving cart return line;
gear boxes of the second moving unit arranged along the base frame of moving cart return line;
rollers of the second moving unit mounted to an end of the gear boxes of the second moving unit for rotating along the moving cart return line; and
power delivery shafts of the second moving unit connecting the drive motor of the second moving unit and the gear boxes of the second moving unit.

8. The moving cart system of claim 7, the moving cart system further comprises:
a third moving unit disposed on the moving cart return line to be connected with each storage unit for the moving cart to be transferred to or from the storage unit,
wherein the storage unit further comprises:
a storage base frame; and
a storage guide rails which are mounted to the storage base frame configured to the storage unit for the moving cart to be transferred along the storage unit.

9. The moving cart system of claim 8,
wherein the third moving unit comprises:
a pair of mounting plates of the third moving unit mounted to the moving cart return line where the storage unit is connected;
rollers disposed on the mounting plate of the third moving unit for rotating along the storage unit;
guide rails of the third moving unit mounted to the mounting plate where the storage unit is connected;
gear boxes of the third moving unit mounted to the base frame of moving cart return line;
power delivery shafts of the third moving unit connecting the gear box of the third moving unit and the roller of the third moving unit;
elevating cylinders of the third moving unit disposed on the base frame of the moving cart return line;
driving rods of the third moving unit connected to the mounting plate of the third moving unit, and operated by each elevating cylinder of the third moving unit for moving up or down the mounting plate of the third moving unit for selectively forming a straight line by the guide rails of the third moving unit and the storage guide rails.

10. The moving cart system of claim 9, wherein the storage unit further comprises:
a storage roller disposed for rotating along the storage unit; and
a storage power delivery shaft connecting the storage drive motor, the storage gear box and the gear box of the third moving unit.

11. The moving cart system of claim 10, the moving cart system further comprising fifth moving units which are mounted to each traverse for the moving cart to be transferred along the traverse.

12. The moving cart system of claim 11,
wherein the fifth moving unit comprises:
drive motors of the fifth moving unit mounted to the base frame of the first traverse and the base frame of the second traverse;
reduction gears of the fifth moving unit attached to the base frame of the first traverse and the base frame of the second traverse and connected to the drive motors of the fifth moving unit;
gear boxes of the fifth moving unit connected to the reduction gears of the fifth moving unit;
rollers of the fifth moving unit attached to the gear boxes of the fifth moving unit for rotating along the traverses; and
power delivery shafts of the fifth moving unit connecting the reduction gears of the fifth moving unit and the gear box of the fifth moving unit.

\* \* \* \* \*